United States Patent [19]

Reed

[11] 3,876,887

[45] Apr. 8, 1975

[54] MOS AMPLIFIER

[75] Inventor: John A. Reed, Los Altos, Calif.

[73] Assignee: Intel Corporation, Santa Clara, Calif.

[22] Filed: July 18, 1973

[21] Appl. No.: 380,349

[52] U.S. Cl............ 307/235 R; 307/304; 330/30 D; 330/35

[51] Int. Cl............................ H03k 5/20; H03f 3/16

[58] Field of Search................ 307/235 R, 238, 304; 330/30 D, 35

[56] References Cited

UNITED STATES PATENTS

| | | | |
|---|---|---|---|
| 3,581,226 | 5/1971 | Perkins et al. | 330/35 X |
| 3,588,537 | 6/1971 | Brink | 307/235 |
| 3,600,609 | 8/1971 | Christensen | 330/30 D |

OTHER PUBLICATIONS

IBM Technical Disclosure Bulletin, Vol. 15, No. 6, November 1972, "Sense Amplifier," by E. C. Jacobson et al., pp. 1732–1733.

*Primary Examiner*—John Zazworsky
*Attorney, Agent, or Firm*—Spensley, Horn & Lubitz

[57] ABSTRACT

A metal-oxide-semiconductor (MOS) differential amplifier particularly suitable for sensing the state of a memory cell, which includes a pair of column lines, is disclosed. The differential amplifier is biased such that it operates in a linear region and is capacitively coupled to the column lines.

4 Claims, 2 Drawing Figures

AN MOS AMPLIFIER

BACKGROUND OF THE INVENTION

1. Field of the Invention

The invention relates to the field of MOS amplifiers, particularly differential amplifiers utilized for sensing the state of a memory cell.

2. Prior Art

One type of semiconductor memory which has become widely used in recent years is an MOS memory which utilizes dynamic storage. Typically, a charge representative of a bit of information is stored on capacitance, such as gate capacitance, and is refreshed periodically within the memory array since the charge is transient. In sensing the presence or absence of the charge, that is in determining the state of the memory cell, often lines in the array are precharged and the presence, absence or decay of the charge on the line is sensed in order to determine the state of the memory cell.

A number of difficulties arise in determining the state of the MOS memory cells in such memory arrays since the difference in potential or charge which must be detected, is relatively small. This problem is aggravated by the fact that the detection for practical purposes must be done on the chip which includes the memory cells, by other MOS devices. MOS devices typically are not sensitive to small or low voltages, particularly where a threshold voltage must be overcome before any conduction occurs in the device. Numerous prior art circuits have been developed to sense the state of memory cells in MOS memories which utilize such techniques as boot-strapping and feedback.

As will be seen, the presently disclosed amplifier includes a pair of MOS transistors which in effect operate as depletion mode transistors as a result of their biasing, overcoming the problem in the prior art associated with overcoming the threshold of an MOS device. Other advantages to the presently disclosed circuit will be apparent from the detailed description of the invention.

SUMMARY OF THE INVENTION

An MOS differential amplifier particularly suitable for sensing the difference in potential in lines coupled to memory cells in a memory array is disclosed. The amplifier includes preconditioning circuitry and a first and second stage of amplification. The preconditioning circuitry includes equalization means for equalizing the potential between the lines prior to the time that the amplifier senses the potential on the lines and capacitor coupling for coupling the lines to the first stage of amplification. Each stage of amplification includes a pair of legs, each having a first MOS device with its gate coupled to one of the lines through a capacitor and one of its other terminals coupled to a constant current source. A load is coupled to the other terminal of the MOS device. The output from each stage of the amplifier comprises a pair of leads coupled to the junction defined by the MOS device and the load. The MOS devices in each leg of each stage of the amplifier operate in a generally linear portion of the device's operating characteristics, since they are biased so as to conduct even when no signal is applied to the gate of the MOS devices. Any difference in potential in the lines causes an imbalance in current through the legs of each stage, thereby changing the output from each stage of the amplifier.

DETAILED DESCRIPTION OF THE INVENTION

Figures 1, 2:
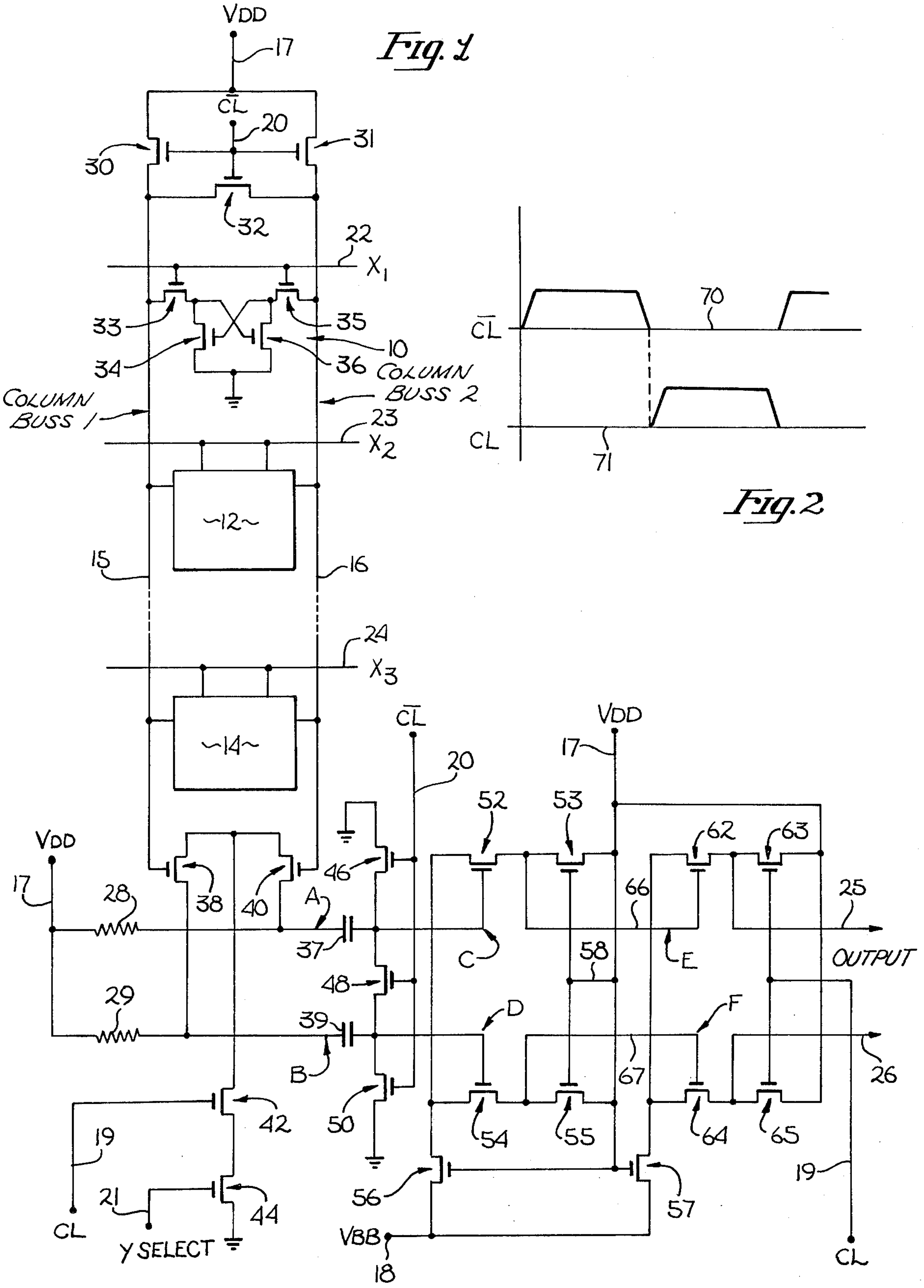
FIG. 1 is a schematic of the invented amplifier which illustrates the preconditioning circuitry of the amplifier, a schematic of one memory cell in a memory array and the first and second stage of amplification.
FIG. 2 is a graph illustrating the waveform of control signals utilized to operate the amplifier.

Referring first to FIG. 1, a portion of a memory array is illustrated which includes column bus 1, line 15 and column bus 2, line 16. A plurality of cells, such as cells 10, 12 and 14, are shown coupled to the lines and also coupled to their respective X line, such as the $X_1$ line, line 22; the $X_2$ line, line 23; and the $X_n$ line, line 24. In the presently preferred embodiment and for the cell illustrated, a pair of column lines are coupled to each of the cells in the array. It will be appreciated that in the entire array, other X lines and other column or Y lines will be utilized.

The amplifier of the present invention includes preconditioning and other circuitry such as MOS devices 32, 38, 40, 42, 44, 46, 48, 49 and 50. A first stage of amplification is illustrated, which includes MOS devices 52, 53, 54, 55 and 56. In a second stage of amplification, which is coupled to the first stage via leads 66 and 67, MOS devices 57, 62, 63, 64 and 65 are utilized. The output of the second stage of amplification is shown as leads 25 and 26.

In the presently preferred embodiment, the entire memory array is fabricated on a single chip and includes 1,024 memory cells, such as memory cell 10, decoding circuitry, buffer circuitry and amplifiers, such as the one illustrated in FIG. 1. An amplifier, such as the one illustrated in FIG. 1, is coupled to each column of memory cells in the array. In the presently preferred embodiment, all the MOS devices are n-channel enhancement mode field effect transistors, which employ silicon gates and include a gate and two other terminals (source and drain).

The control signals which are applied to the array and memory cell include a periodic timing or clock signal illustrated as CL in FIG. 2 on abscissa 70. The complement to this signal $\overline{CL}$, which is generated on the chip which includes the memory array, is also utilized and is illustrated in FIG. 2 on abscissa 70. In the circuit of FIG. 1, the $\overline{CL}$ signal is applied to lead 19 while the CL signal is applied to lead 20. A positive potential $V_{DD}$ is utilized as one source of power for the array and amplifiers. This positive potential for the n-channel devices illustrated is applied to lead 17. A negative voltage $V_{BB}$, used as a substrate bias voltage for the substrate on which the memory array is fabricated, is also used for biasing a portion of the amplifier and is coupled to lead 18. Y select line 21 is coupled to appropriate circuitry in the array such that a positive potential appears on lead 21 when a particular column in the array has been selected.

As will be appreciated, the memory array, and in particular the amplifier or amplifiers used in conjunction with it, may be fabricated from P-channel devices with the appropriate change in potential polarities required for these devices. Also, while in the presently preferred embodiment a bistable dynamic cell 10 is illustrated and utilized, other cells may likewise be used in conjunction with the disclosed amplifier.

First, a description of the memory cell 10 used in the memory array shall be given, since this should aid in an understanding of the disclosed amplifier. The bistable dynamic memory cell includes a first leg which comprises MOS devices 33 and 34 and a second leg which comprises MOS devices 35 and 36. The gates of devices 33 and 35 are coupled to the $X_1$ line, line 22, while one terminal of these devices are coupled to the respective column lines, lines 15 and 16. The other terminal of MOS device 33 is coupled to the gate of device 36 and also to one terminal of device 34. Likewise, the other terminal of device 35 is coupled to the gate of device 34 and also to one terminal of device 36. A "1" is stored in the cell in the form of a charge on the parasitic capacitance defined by the gates of either MOS device 34 or 36. Assume for purposes of explanation that a "1" exists in the memory cell when a charge is present on the gate of device 34. To program the cell with a "1," a positive potential is applied to the $X_1$ line such that devices 33 and 35 conduct while a positive charge is placed on the column bus line 16. No charge is placed on the column bus line 15. The charge on column bus line 16 is transferred from line 16 onto the gate of device 34, thus device 34 will conduct and device 36 will not conduct since no charge is present on line 15 to be transferred onto the gate of device 36. In a similar manner, if a "0" were to be programmed into cell 10, a charge would have been placed on the gate of device 36 and no charge would have been transferred onto the gate of device 34. As is the case with other dynamic storage devices, the cell must be periodically refreshed since the charge on the gate of either device 34 or 36 dissipates. Refreshing of the cell 10 may be performed by known techniques.

When it becomes necessary to read the information from a cell, such as cell 10, first the column lines (lines 15 and 16) of the selected column are precharged or preconditioned positively, this is performed, as will be discussed, through MOS devices 30 and 31 during $\overline{CL}$ time, that is when $\overline{CL}$ is positive. When the appropriate Y line is selected, such as line 21, the charge on one of the column lines (either line 15 or 16) will be dissipated more rapidly than the charge on the other column line. For example, assume that a "1" has been programmed into cell 10, that is a charge exists on the gate of device 34 and assume further that the $X_1$ line has been selected such that the devices 33 and 35 conduct. Since a charge exists on the gate of device 34, a conductive path to ground from line 15 will exist through devices 33 and 34, dissipating the charge on line 15. Since no charge exists on the gate of device 36 and further, since the drain of device 34 is close to ground potential, little or no charge from line 16 will pass to ground through the devices 35 and 36. Thus, a difference in potential will occur between lines 15 and 16. It is this difference in potential which is sensed by the disclosed amplifier and which is used to determine if the selected cell has been programmed with either a "1" or a "0."

For the purposes of explanation, the input to the first stage of amplification is illustrated as nodes C and D while the input to the second stage of amplification (which is also the output of the first stage) is illustrated as nodes E and F. The circuitry which interconnects the column bus lines and the input to the first stage of amplification, which includes preconditioning circuitry for the amplifiers and other circuitry will first be described. Both lines 15 and 16 are coupled to the $V_{DD}$ source of potential, line 17 through MOS devices 30 and 31. The gates of devices 30 and 31 are coupled to the $\overline{CL}$ line 20. Device 32, which is utilized to equalize the potential on lines 15 and 16 during $\overline{CL}$, has its terminals coupled to lines 15 and 16. The gate of MOS device 32 is likewise coupled to the $\overline{CL}$ line 20.

Lines 15 and 16 are coupled to the gates of MOS devices 38 and 34, respectively. One terminal of device 38 is coupled to node B and one terminal of device 40 is coupled to node A. The other terminals of devices 38 and 40 are coupled to ground through the series combination of MOS devices 42 and 44. The gate of device 42 is coupled to line 19, the CL line, while the gate of device 21 is coupled to the Y select line. A resistor 28 is coupled in series between node A and lead 17, while a resistor 29 is coupled in a similar fashion between node B and line 17. As will be seen, these resistors are utilized to charge capacitors 37 and 39. Nodes A and B are coupled to nodes C and D through capacitors 37 and 39, respectively. The capacitors 37, 39 and the resistors 28 and 29 are fabricated on the chip, utilizing known MOS technology.

Additional equalization circuitry equalizing the potential between nodes C and D during $\overline{CL}$ includes MOS devices 46, 48 and 50. Device 46 has one of its terminals coupled to ground and the other of its terminals coupled to node C. In a similar manner device 50 has one of its terminals coupled to node D and its other terminal coupled to ground. MOS device 48 has its terminals coupled between nodes C and D. The gates of devices 46, 48 and 50 are all coupled to the $\overline{CL}$ line 20.

Each stage of amplification includes a pair of legs which, for the first stage of amplification, includes a first leg which comprises MOS devices 52 and 53 and a second leg which comprises devices 54 and 55. One terminal of MOS device 52 and 54 is coupled to one terminal of device 56, the other terminal of device 56 being coupled to lead 18. The other terminals of devices 52 and 54 are coupled to one terminal of MOS devices 53 and 55, respectively, while the other terminals of devices 53 and 55 are coupled to line 17. The gates of devices 53 and 55 are coupled to lead 17 via lead 58. The output of the first stage of amplification is the junction formed between devices 52 and 53, node E, and the junction between devices 54 and 55, node F. As will be discussed in greater detail, the gate of device 56 is coupled to line 17 and device 56 acts as a source of constant current for the legs of the differential amplifier. Additionally, devices 53 and 55 act as loads for their respective legs and hence other load means, such as resistors, may be utilized. MOS devices 52 and 54 operate in a linear region, as will be discussed, because of the negative biasing applied through device 56 from lead 18. Thus, devices 52 and 54 are in effect operated as depletion mode MOS devices and hence depletion mode devices may be utilized in lieu of the enhancement mode devices utilized in the presently preferred embodiment.

The second stage of amplification is similar to the first stage and includes a first leg comprising MOS devices 62 and 63 and a second leg comprising MOS devices 64 and 65. A constant current source which comprises MOS device 57 is coupled at one terminal to lead 18 and at the other terminal to one terminal of devices 62 and 64. MOS devices 63 and 65 are utilized as loads and one of their terminals are coupled to lead 17, while their gate is coupled to lead 19, the CL line. The input to this stage of amplification are the gates of devices 62 and 64, nodes E and F respectively. The outputs from this stage of amplification are the junctions formed by MOS devices 62 and 63 and devices 64 and 65 shown as leads 25 and 26, respectively. Once again, as was the case with the first stage of amplification, devices 62 and 64 operate as depletion mode devices because of the biasing applied through lead 18.

To most readily understand the operation of the circuit, it will be assumed that first $\overline{CL}$ positive (high) while CL is at zero (low), as is illustrated in FIG. 2 at approximately time zero. During $\overline{CL}$ (when $\overline{CL}$ is high) the positive voltage applied to lead 20 causes devices 30 and 31 to conduct in addition to device 32. The conduction of devices 30 and 31 allows the column bus lines to be precharged from the positive voltage applied to lead 17. Device 32, since it also conducts, assures that the potential between the column bus lines is equal. During $\overline{CL}$ devices 46, 48 and 50 also conduct. Devices 46 and 50 assure that nodes C and D are grounded, while device 48 equalizes any charge or voltage imbalance which may exist between nodes C and D. It should be noted that during $\overline{CL}$ capacitors 37 and 39 will be charged from lead 17 through resistors 28 and 29, respectively. Note no path exists to ground through devices 38 or 40 since at least device 42 is not conducting since no signal is applied to lead 19 during $\overline{CL}$.

During $\overline{CL}$ a current flows through device 56 and through both legs of the first stage of amplification since, as previously mentioned, devices 52 and 54 conduct because of the negative potential applied to these devices through lead 18 and device 56. The same result may be obtained without the negative biasing if device 52 and 54 were diffused such that they were depletion mode devices. Since the loads which comprise devices 53 and 55 have their gates coupled to a positive potential $V_{DD}$ through lead 58, these devices are continually conducting. Note since nodes C and D are both at the same potential (ground potential) during $\overline{CL}$, the current flow through the two legs of the first stage of amplification is substantially equal. Unlike the first stage of amplification, the second stage of amplification does not conduct during $\overline{CL}$ since the loads, MOS devices 63 and 65 have their gates coupled to lead 18, the CL signal.

Assume that during CL the Y select line, line 21, is selected and a positive potential applied to the gate of device 44 and additionally that the $X_1$ line, line 22, has also been selected such that a positive potential is applied to the gates of devices 33 and 35. As previously explained, depending on the state of cell 10, that is where it has been previously programmed with a "1" or a "0," one of the lines, 15 or 16, will discharge. Assume further, for the sake of discussion, that line 16 discharges more rapidly than line 15. As this occurs, device 40 will be prevented from conducting while device 38 will conduct, this will cause node B to decay towards ground through the path consisting of devices 38, 42 and 44. This change in potential on node B causes a corresponding differential potential between nodes C and D. Thus, an imbalance of current will occur between the first and second legs of the first stage of amplification and this imbalance will be reflected as a potential difference between nodes E and F of the second stage of amplification. This imbalance will cause a corresponding current imbalance in the first and second legs of the second stage of amplification and this will be reflected in the output leads 25 and 26. By sensing the output leads 25 and 26, the state of cell 10 may be determined.

Since nodes C and D are capacitively coupled to lines 15 and 16, these nodes may operate about a "0" potential in the presently preferred embodiment, and at this potential, due to the negative biasing on lead 18, devices 52 and 54 operate substantially in a linear region and hence are very sensitive to voltage changes on nodes C and D. Unlike prior art sensing amplifiers for similar applications, no threshold need be overcome in devices 52 and 54 before these devices conduct. Similarly, devices 62 and 64 of the second stage of amplification operate in a substantially linear region of their operating characteristics. (Note that in the second stage of amplification, when CL returns to "0," devices 63 and 65 no longer conduct and leads 25 and 26 are returned to the same potential.)

Thus, an amplifier has been disclosed which includes equalization circuitry for equalizing the potential between column lines prior to the time that the state of a cell is determined. The amplifier also includes MOS devices which nominally operate in a linear region and which are capacitively coupled to the column lines in a memory array. The entire amplifier may be fabricated utilizing known MOS technology.

I claim:

1. An amplifier for sensing the difference in potential between a pair of lines comprising:
- a first electrical source;
- a first capacitor;
- a first leg which includes at least one MOS device coupled to one of said lines through said first capacitor, said first leg being coupled to said first electrical source;
- a second capacitor;
- a second leg coupled to said first leg and to said first electrical source, said second leg including at least one MOS device coupled to the other of said lines through said second capacitor;
- circuit biasing means coupled to said MOS device of said first leg and said MOS device of said second leg;
- a second electrical source coupled to said circuit biasing means for biasing said MOS device of said first leg and said MOS device of said second leg such that said devices operate in a generally linear region;
- whereby the current flowing through said first and second leg is representative of the potential on said lines.

2. The amplifier defined in claim 1 including means for selectively equalizing potential between said first and said second capacitors.

3. The amplifier defined in claim 2 wherein said equalization means comprises an MOS device which includes a source terminal, a drain terminal and a gate, said source terminal and drain terminal being coupled between said first and said second capacitors.

4. The amplifier defined in claim 1 wherein said first and said second capacitors are coupled to said first electrical source.

* * * * *